United States Patent [19]

Patterson

[11] 4,013,959

[45] Mar. 22, 1977

[54] TRANSMITTER CONTROL APPARATUS

[75] Inventor: Hubert A. Patterson, Lynchburg, Va.

[73] Assignee: General Electric Company, Lynchburg, Va.

[22] Filed: Mar. 5, 1976

[21] Appl. No.: 664,084

[52] U.S. Cl. .......................... 325/57; 340/147 LP; 340/150; 340/217; 340/295; 340/346; 343/177

[51] Int. Cl.² ........................................ H04B 1/02

[58] Field of Search ............. 325/101, 51, 57, 158, 325/161, 164, 166, 183, 187, 55; 178/58 R, 58 A; 343/177, 207, 208; 179/2 CA, 2 AM; 340/150, 151, 152 R, 152 T, 295, 311, 312, 147 LP, 346, 217, 287

[56] References Cited

UNITED STATES PATENTS

| | | | |
|---|---|---|---|
| 2,271,305 | 1/1942 | Mullerheim | 340/295 |
| 2,662,974 | 12/1953 | Dorff | 325/158 |
| 2,731,622 | 1/1956 | Doremus et al. | 325/57 |
| 3,772,667 | 11/1973 | Falck, Jr. | 340/217 |
| 3,825,897 | 7/1974 | Lawton | 340/147 LP |

Primary Examiner—Robert L. Griffin
Assistant Examiner—Marc E. Bookbinder
Attorney, Agent, or Firm—James J. Williams

[57] ABSTRACT

A plurality of transmitters, such as radio transmitters, frequently share a common communication medium or path, such as a single radio frequency channel. In order to prevent two transmitters from simultaneously transmitting over the common medium, each transmitter is provided with control apparatus. This apparatus causes transmission in response to a start action and in the absence of any other transmission on the medium. The apparatus also produces a repeating signal at predetermined intervals in response to the start action, so that if there is a transmission on the medium, the repeating signal continues until such time as there is an absence of any transmission on the medium. The repeating signal then causes a transmission, and thereafter the repeating signal is stopped. The interval between repeating signals may be the same for each transmitter, but simultaneous transmission by two transmitters will not or is very unlikely to occur because start times are likely to be different.

6 Claims, 1 Drawing Figure

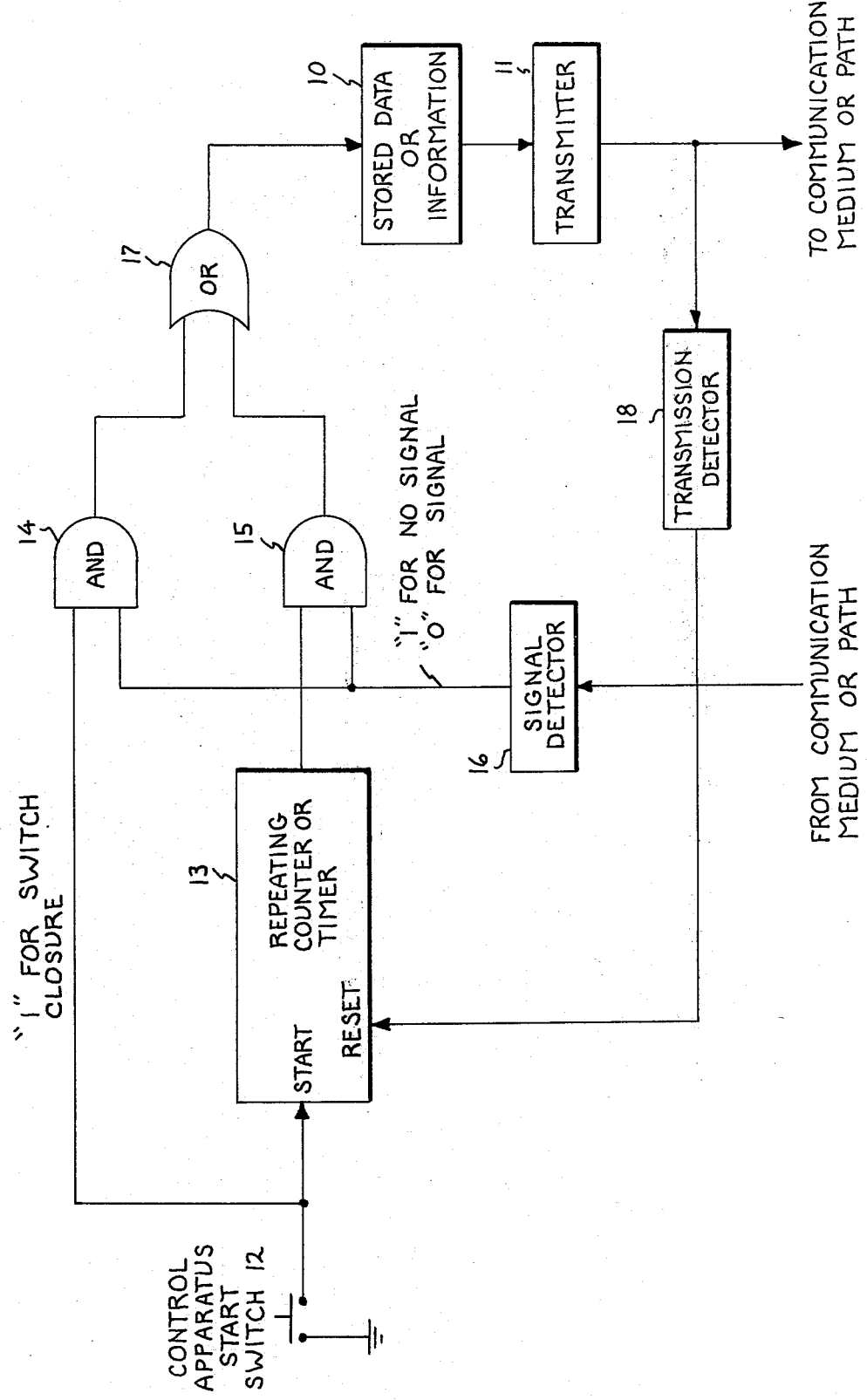

TRANSMITTER CONTROL APPARATUS

BACKGROUND OF THE INVENTION

My invention relates to transmitter control apparatus, and particularly to transmitter control apparatus for reducing or eliminating the simultaneous transmission by two transmitters on a common communication medium or path.

A communication medium or path, such as a radio frequency channel, is frequently shared by a number of transmitters to conserve communication facilities or the radio frequency spectrum. This is particularly true where a given transmitter is operated for a relatively small amount of time. For example, a radio transmitter may be provided on each of a number of vehicles, such as a public bus, for the purpose of transmitting stored information, such as bus location, number of passengers, or some condition on the bus. The time required to transmit such information is very short, because the transmission can be done in a high speed data burst. However, if such transmissions are simultaneously made by two or more transmitters, it is likely that interference will occur, and no information will be received in usable form.

Accordingly, a primary object of my invention is to provide new and improved control apparatus for preventing simultaneous transmissions by a plurality of transmitters over a common communication medium or path.

Another and relatively specific object of my invention is to provide a new and improved control that produces repeating signals at a predetermined interval, the repeating signals causing a transmitter to transmit when a common communication medium is not in use.

Control apparatus for eliminating simultaneous transmission have been provided, but such apparatus have not always met the needs of systems where stored information or data should be or must be transmitted automatically, or should be or must be transmitted after a start action by an operator but without further action by the operator.

Accordingly, another object of my invention is to provide a new and improved control that accepts a start action at any time and that automatically continues to attempt to cause transmissions at periodic intervals, but that does not cause such transmissions until the common communication medium or path is free of other transmissions.

SUMMARY OF THE INVENTION

Briefly, these and other objects are achieved in accordance with my invention by control apparatus having means for causing a transmitter to transmit information in response to a start action of the control apparatus and in the absence of any other transmission on a common communication medium. My apparatus also comprises means for producing repeating signals at some predetermined interval in response to the start action of the apparatus. Means are connected to the repeating signal producing means for producing a transmit signal in response to one of the repeating signals and in the absence of any other transmission on the common communication medium. Thus, if a transmission is on the common communication medium when the control apparatus is started, the transmission will be attempted each time the repeating signal is produced until such time as the communication medium has no other transmission on it. Thereafter, the transmission is effected, and the repeating signal producing means reset to await another start action of the control apparatus.

BRIEF DESCRIPTION OF THE DRAWING

The subject matter which I regard as my invention is particulary pointed out and distinctly claimed in the claims. The structure and operation of my invention, together with further objects and advantages, may be better understood from the following description given in connection with the accompanying drawing, in which the single FIGURE shows one preferred embodiment of my invention.

DESCRIPTION OF A PREFERRED EMBODIMENT

In the FIGURE, I have assumed that information or data to be transmitted is stored or indicated by any suitable means 10, such as a memory or other logic storing device. However, this data or information may be provided in any manner, such as a direct reading from a sensing or other type of device. For many applications, it is desirable that this data or information be automatically sent over a single or common communication medium or path, such as a radio channel, by a transmitter 11 in response to the momentary closure of a normally open control apparatus start switch 12. The control apparatus start switch 12 is arranged to provide a suitable signal, such as a ground connection, for starting this transmission. For the purposes of explanation, I have assumed that this suitable signal is a binary logic 1. This signal is applied to the start input of a repeating counter or timer 13. The counter or timer 13 may take any suitable form, such as a clock driven shaft register or ring counter which produces a logic 1 at its output at selected predetermined time intervals. These time intervals may be set as desired, for example one second. The repeating signal from the counter or timer 13 is applied to one input of an AND gate 15. The starting signal is also applied to one input of an AND gate 14. A signal detector 16 is provided to sense whether there is a transmission on the common communication medium or path. If the path is a radio channel, this can be a suitable radio receiver and detector. If there is no signal on this path, the detector 16 produces a logic 1. However, if there is a signal on the path, the detector 16 produces a logic 0. The output of the detector 16 is applied to each of the other inputs of the AND gates 14, 15. The outputs of the AND gates 14, 15 are applied to the two inputs of an OR gate 17. The output of the OR gate 17 is connected to the data storage 10. When the OR gate produces a logic 1, the stored data or information in the data storage 10 is applied to the transmitter 11 for transmission over the communication medium or path. When this occurs, the output of the transmitter 11 is applied to a transmission detector 18 which senses the output of the transmitter 11 and produces a reset signal to cause the repeating counter or timer 13 to be reset and stop producing its repeating signals.

When stored data or information is to be transmitted, the control apparatus start switch 12 is momentarily actuated. This may be done by an operator, or may be done automatically at timed intervals, or may be done in response to a signal from a near or distant location. When the switch 12 is closed, it provides a logic 1 to the AND gate 14. If there is no signal on the communication medium or path, the signal detector 16 provides a logic 1 at the same time, so that the AND gate 14 supplies a logic 1 to the OR gate 17. This logic 1 is passed to start transmission of the stored data or information. This data is applied to the transmitter 11 for transmission over the communication medium or path. The transmission detector 18 detects this transmission and provides a reset signal to the counter or timer 13 to reset the counter or timer 13 that had started to produce the repeating signals in response to closure of the switch 12. After the stored data or information is transmitted, the circuit stops operating until such time as the transmit start switch 12 is actuated again.

If, when the switch 12 is actuated, there is a transmission on the communication medium or path, the signal detector 16 supplies a logic 0 to the AND gate 14 so that the AND gate 14 does not supply a logic 1 to the OR gate 17. However, the repeating counter or timer 13 begins to produce the repeating signals at the selected predetermined time intervals. These signals are in the form of a logic 1, and are supplied to the AND gate 15. However, the AND gate 15 cannot produce a logic 1 at its output until such time as there is no signal present on the communication medium or path. When there is no signal on the path, indicating that no other transmitter is transmitting, the signal detector 16 produces a logic 1. At the next occurrence of the repeating signal, the AND gate 15 then produces a logic 1 which is passed by the OR gate 17 to start transmission of the stored data or information. This causes the transmitter 11 to transmit the information over the communication medium or path. The transmission detector 18 detects this transmission and resets the counter or timer 13 so that the control apparatus of my invention is then ready for another initiation of the switch 12.

It will thus be seen that I have provided a new and improved control apparatus which substantially or almost completely eliminates the possibility of simultaneous transmissions on a common communication medium or path. My circuit requires only one actuation of the switch 12 to cause this transmission, even though the transmission may not occur for some time because the communication medium or path has a transmission on it. However, my repeating counter or timer 13 produces the repeating signal at selected predetermined time intervals, and when the communication medium or path is idle, the repeating signal then causes the transmission to take place. This transmission also serves to reset the counter or timer. While I have shown the various circuit elements in block diagram form, persons skilled in the art will appreciate that these elements may take a number of forms. The counter or timer 13 can be a shift register, a ring counter, or pulse generator, any of which can have the desired interval between output signals. From a production standpoint, I prefer that the interval between pulses be the same for all control apparatus. Simultaneous transmissions are still unlikely to occur, because simultaneous actuations of two of the start switches 12 is so unlikely. The AND and OR gates are known elements. The data can be stored in any suitable means, such as a memory. The signal and transmission detectors 16, 18 may be any type of detector which responds to transmissions and produce a suitable signal for performing the indicated functions. Therefore, while my invention has been described with reference to a particular embodiment, it is to be understood that modifications may be made without departing from the spirit of the invention or from the scope of the claims.

What I claim as new and desire to secure by Letters Patent of the United States is:

1. Apparatus for controlling the transmission of stored data or information from at least one of a plurality of radio transmitters or the like over a common medium comprising:
   a. first gating means having first and second inputs and an output;
   b. second gating means having first and second inputs and an output;
   c. start signal producing means;
   d. a repeating device having a start input connected to said start signal producing means and having an output at which a signal is repetitively produced at predetermined intervals in response to a start signal applied to said start input;
   e. means responsive to the absence of transmission on said common medium for producing a first signal;
   f. means connecting said inputs of said first gating means to said start signal producing means and to said medium responsive means for causing said first gating means to produce a first transmit signal in response to said start signal and said first signal occurring at the same time;
   g. means connecting said inputs of said second gating means to said repeating device output and to said medium responsive means for causing said second gating means to produce a second transmit signal in response to said repetitive signal and said first signal occurring at the same time;
   h. and means for connecting said first and second gating means outputs to said one transmitter so as to cause transmission in response to one of said transmit signals.

2. The apparatus of claim 1 wherein said repeating device has a reset input for resetting said repeating device in response to said transmission.

3. Apparatus for controlling an information transmitter sharing a common medium with at least one other information transmitter so as to prevent simultaneous transmission by a plurality of transmitters over said medium, said apparatus comprising:
   a. means for producing a start signal;
   b. means for producing a first transmit signal in response to said start signal and the absence of any other transmission on said medium;
   c. means for producing repeating signals in response to said start signal;
   d. means for producing a second transmit signal in response to one of said repeating signals and the absence of any other transmission on said medium;
   e. and means to cause said controlled transmitter to transmit said information in response to one of said transmit signals.

4. The apparatus of claim 3, and further comprising means connected to said repeating signal producing means for stopping said repeating signals in response to the transmission of said controlled transmitter.

5. Apparatus for controlling an information transmitter sharing a common medium with at least one other information transmitter so as to prevent simultaneous transmission by a plurality of transmitters over said medium, said apparatus comprising:
   a. input means for receiving a start signal;
   b. first means for producing a first transmit signal in response to said start signal and the absence of any other transmission on said medium;

c. second means for producing repeating signals in response to said start signal;
d. third means for producing a second transmit signal in response to one of said repeating signals and the absence of any other transmission on said medium;
e. and output means connected to said first and third means for causing said controlled transmitter to transmit said information in response to one of said first and second transmit signals.

6. The apparatus of claim 5, and further comprising means connected to said repeating signal producing means for stopping said repeating signals in response to the transmission of said controlled transmitter.

* * * * *